United States Patent
Chen et al.

(10) Patent No.: US 11,716,702 B2
(45) Date of Patent: *Aug. 1, 2023

(54) ESTIMATING GEOLOCATION OF A USER TERMINAL

(71) Applicant: Hughes Network Systems, LLC, Germantown, MD (US)

(72) Inventors: Liping Chen, Bethesda, MD (US); Lin-Nan Lee, Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/819,773

(22) Filed: Aug. 15, 2022

(65) Prior Publication Data

US 2022/0394661 A1 Dec. 8, 2022

Related U.S. Application Data

(63) Continuation of application No. 17/072,938, filed on Oct. 16, 2020, now Pat. No. 11,452,066.

(51) Int. Cl.
*H04W 64/00* (2009.01)
*H04B 17/318* (2015.01)
(Continued)

(52) U.S. Cl.
CPC ......... *H04W 64/006* (2013.01); *G01S 5/0284* (2013.01); *H04B 17/318* (2015.01); *H04W 24/10* (2013.01); *G06F 2218/12* (2023.01)

(58) Field of Classification Search
None
See application file for complete search history.

(56) References Cited

U.S. PATENT DOCUMENTS

2007/0254673 A1* 11/2007 Stenberg .................. G01S 5/14
455/456.1
2019/0230588 A1* 7/2019 Kim .................. H04W 36/0055

FOREIGN PATENT DOCUMENTS

| EP | 3201645 B1 * | 6/2018 | ............. G01S 19/42 |
| EP | 3201645 B1 | 6/2018 | |
| WO | 2016050258 A1 | 4/2016 | |

OTHER PUBLICATIONS

Axel Kupper et al: "Part II Positioning" In: "Location-based Services: Fundamentals and Operation", Dec. 6, 2005 (Dec. 6, 2005), John Wiley & Sons, Inc., XP055288600, pp. 123-245, DOI: 10.1002/0470092335, section 6.2.5.

(Continued)

*Primary Examiner* — Adolf Dsouza
(74) *Attorney, Agent, or Firm* — Capitol City TechLaw; Jasbir Singh

(57) ABSTRACT

A system and method for estimating a geolocation The method includes subdividing the camping cell into grid points where each grid point of the grid points has an associated relative offset from a camping beam center; illuminating the camping cell with a camping beam and each of the adjacent cells with adjacent beams; receiving a camping beam signal strength and adjacent beams signal strengths for each grid point of the grid points; profiling, at each grid point of the grid points, ratios of the camping beam signal strength to each one of the adjacent beams signal strengths; mapping the ratios and the associated relative offset of each grid point of the grid points; and estimating a relative geolocation of a User Terminal (UT) from the camping beam center based on a UT camping beam signal strength and UT adjacent beams signal strengths.

20 Claims, 4 Drawing Sheets

(51) Int. Cl.
*G01S 5/02* (2010.01)
*H04W 24/10* (2009.01)

(56) References Cited

OTHER PUBLICATIONS

Claude Takenga et al: "A Hybrid Neural Network—Data Base Correlation Positioning in GSM Network", Communication Systems, 2006. ICCS 2006. 10th IEEE Singapore International Conference On, IEEE, PI, Oct. 1, 2006 (Oct. 1, 2006), pp. 1-5, XP031042286, ISBN: 978-1-4244-0410-0, section III.A, section III.B.

Ericsson et al: "On scenarios and assumptions for RFPM studies", 3GPP Draft; R4-115060 on Scenarios and Assumptions for RFPM Studies, 3rd Generation Partnership Project (3GPP), Mobile Competence Centre; 650, Route Des Lucioles ; F-06921 Sophia-Antipolis Cedex; France, vol. RAN WG4, No. Zhuhai; Oct. 10, 2011, Oct. 3, 2011 (Oct. 3, 2011), XP050544164 [retrieved on Oct. 3, 2011] section 2.1.1.

International Search Report for PCT/US2021/071704.

THALES: "Report on email discussion Rel-17 NWI Non Terrestrial Networks scoping", 3GPP Draft; RP-192500, 3rd Generation Partnership Project (3GPP), Mobile Competence Centre ; 650, Route Des Lucioles ; F-06921 Sophia-Antipolis Cedex; France, vol. TSG RAN, No. ; Sep. 9, 2019-Sep. 12, 2019 Dec. 2, 2019 (Dec. 2, 2019), XP051834140, Retrieved from the Internet: URL:https://ftp.3gpp.org/tsg_ran/TSG_RANTSGR 86/Docs/RP-192500.zip RP-192500 Rel-17 NWI NTN scoping discussion_report_y4.docx Retrieved on Dec. 3, 2019.

* cited by examiner

ESTIMATING GEOLOCATION OF A USER TERMINAL

CROSS-REFERENCE TO RELATED APPLICATIONS AND INCORPORATION BY REFERENCE

The present application is a continuation of U.S. application Ser. No. 17/072,938, filed Oct. 16, 2020, which is incorporated herein by reference in its entirety.

FIELD

A system and method for estimating a geolocation of a User Terminal (UT) by estimating a UT's geolocation, based on power ratios of a camping and adjacent beam strength, when the UT is disposed within a beam's coverage area of a multibeam communication system. The system and method may be used when the beams are formed from a High-Altitude Platform (HAP), Geosynchronous Earth Orbit (GEO) satellite, a Medium Earth Orbit (MEO), a Low Earth Orbit (LEO) satellite, an airplane, a platform 20,000 feet above sea-level or the like. The present teachings may use interpolation or a neural network to estimate a geolocation that substitutes for or complements a Global Navigation Satellite System (GNSS).

BACKGROUND

The Prior art satellite systems, for example, Geosynchronous Earth Orbiting (GEO) systems, usually implement User Terminal (UT) positioning with the help of a Global Navigation Satellite System (GNSS) such as a Global Positioning Satellite System (GPS). In some instances, GNSS may be unavailable due to intended or unintended jamming or interference. As such, it is desirable that a UT estimate its location by itself or in cooperation with a gateway with some precision.

Common prior art for positioning techniques uses these four parameters: Angle of Arrival, Time of arrival, time difference of arrival and received signal strength indicator. In the context of UT positioning in a satellite network, angle of arrival typically does not provide sufficient resolution to be useful. The other parameters are typically used to derive range information. The UT location is determined by triangulation with known positions. Common prior art positioning techniques are generally known as range-based positioning techniques that use a trilateration or multi-lateration technique to compute the location of UT. All prior techniques require multiple signal sources, each from a known location.

A good example is the Global Positioning Satellite System (GPS). GPS is based on Time Difference of arrival. It requires at least three plus one Medium Earth Orbiting (MEO) satellites to accurately locate an object. In geosynchronous satellite (GEO) communication systems, the UTs are usually pointed to a serving satellite using directional antennas to establish good connectivity with the satellite and it is impractical to have access to more than one GEO satellite to implement the multi-lateration technique.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

There is need to identify UT location in GEO satellite system in case of country boundary related handover, legal inception and billing policy. There is no good prior art about User Terminal (UT) location estimation in without GNSS's help. The prior art is particularly lacking in satellite systems.

The present teachings measure a UT's relative location from a beam center when the UT is disposed within a beam's coverage area. The UT's geolocation may be calculated by offsetting a beam center geolocation location with the UT's location relative to the beam center. A Neural Network classifier may be used (for example, at the UT or the gateway (GW)) to estimate a UT's relative location to the beam center.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for estimating a geolocation. The method includes tessellating a coverage area into a camping cell and adjacent cells; subdividing the camping cell into grid points where each grid point of the grid points has an associated relative offset from a camping beam center; illuminating, with a platform, the camping cell with a camping beam and each of the adjacent cells with adjacent beams; receiving a camping beam signal strength and adjacent beams signal strengths for each grid point of the grid points; profiling, at each grid point of the grid points, ratios of the camping beam signal strength to each one of the adjacent beams signal strengths; mapping the ratios and the associated relative offset of each grid point of the grid points; and estimating a relative geolocation of a User Terminal (UT) from the camping beam center based on a UT camping beam signal strength and UT adjacent beams signal strengths. Other embodiments of this aspect include corresponding computer systems, apparatus, and computer programs recorded on one or more computer storage devices, each configured to perform the actions of the methods.

Implementations may include one or more of the following features. The method where the mapping may include populating a look up table (LUT) with ratios and the associated relative offset, and the estimating by interpolation from measured ratios of the UT camping beam signal strength and the UT adjacent beams signal strengths between the ratios of grid points in the LUT to find a best match, and determines the relative geolocation of the UT based on the best match. The populating may include adding the UT geolocation, the UT camping beam signal strength and UT adjacent beams signal strengths to the LUT.

In some embodiments, the mapping may include pretraining neural network weights of a neural network with ratios and the associated relative offset, and the estimating estimates the relative geolocation of the UT with the neural network. The method may include receiving a UT geolocation, a UT camping beam signal strength and UT adjacent beams signal strengths; and training the neural network with the UT geolocation, the UT camping beam signal strength and UT adjacent beams signal strengths.

The receiving may include measuring, at one or more of the grid points, the camping beams signal strength and the adjacent beams signal strengths. The receiving may include computing, at one or more of the grid points, the camping beams signal strength and the adjacent beams signal strengths. The method may include adjusting the camping beam signal strength and each one of the adjacent beams signal strengths to a reference transmit power. The ratios are calculated as Pc/Pai or 10*log 10(Pc/Pai), with the Pc set to the camping beam signal strength and the Pai set to each one of the adjacent beams signal strengths in turn. The method may include predicting a location estimate offset based on a slow varying geosynchronous-earth orbit satellite pointing error or a movement of the camping beam center based on feedback from a pilot UT and ephemeris of the platform; and compensating for the location estimate offset in the estimating. Implementations of the described techniques may include hardware, a method or process, or computer software on a computer-accessible medium.

One general aspect includes a system to estimate a geolocation. The system includes a coverage area tessellated into a camping cell and adjacent cells, and the camping cell subdivided into grid points, where each grid point of the grid points has an associated relative offset from a center of the camping cell; a platform to illuminate the camping cell with a camping beam and each of the adjacent cells with adjacent beams; and a geolocation estimator, The geolocation estimator may receive a camping beam signal strength and adjacent beams signal strengths for each grid point of the grid points, may profile, at each grid point of the grid points, ratios of the camping beam signal strength to each one of the adjacent beams signal strengths, may map the ratios and the associated relative offset of each grid point of the grid points, and may estimate a relative geolocation of a user terminal (UT) from the camping beam center based on a UT camping beam signal strength and UT adjacent beams signal strengths. Other embodiments of this aspect include corresponding computer systems, apparatus, and computer programs recorded on one or more computer storage devices, each configured to perform the actions of the methods.

Additional features will be set forth in the description that follows, and in part will be apparent from the description, or may be learned by practice of what is described.

DRAWINGS

In order to describe the way, the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Figure 1:
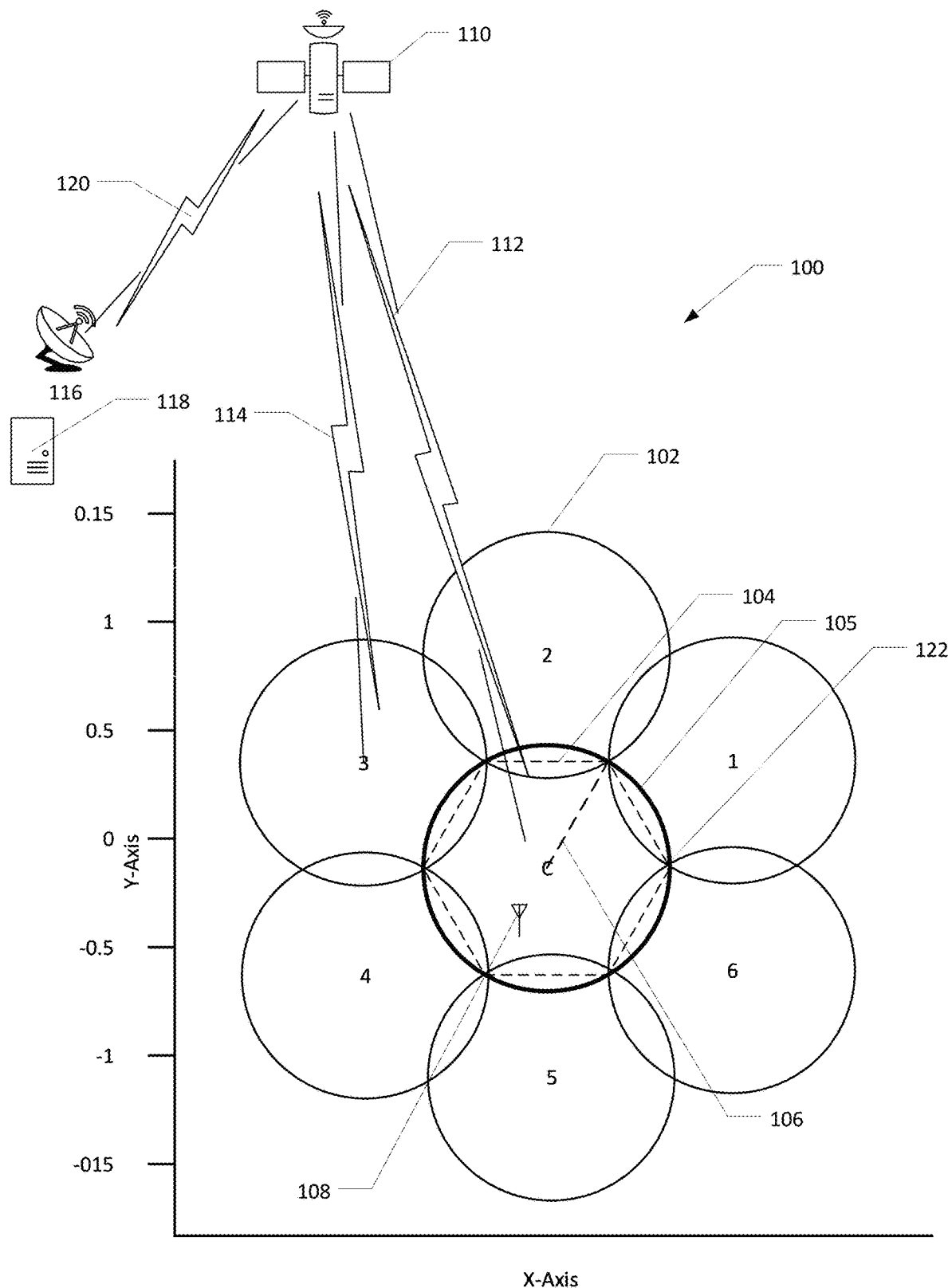
FIG. 1 illustrates a multi-beam satellite or high-altitude platform system according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

There is no good prior art about User Terminal (UT) location estimation without GNSS's help. The prior art is particularly lacking in satellite systems. The UT location can be very useful in satellite communication. Often, satellite beams are wide so that a beam may illuminate a camping cell and neighboring cells. As such a beam may cover several jurisdictions such as countries, states/provinces, counties or the like. The UT's geolocation information may be used for billing, law enforcement and other purposes. A signal power difference measurement mapping may be used to estimate a geolocation of a user terminal (UT) in a multi-beam satellite or high-altitude platform system. The mapping may be used as weights for a Neural Network based classifier, for interpolation based on a look up table, or the like. The camping beam refers to the beam serving the UT. Camping cell refers to the cell area served by the camping beam within which the UT is located. Unless specified otherwise, a camping cell and camping beam are interchangeable in the present teachings.

For mobile satellite applications, the UT location may be used for asynchronous communication from a gateway to the UT, for example, when the UT is being paged, when the UT is in IDLE mode. Without the UT's location, paging messages may have to be duplicated and broadcast in multiple beams, reducing spectrum efficiency. With the knowledge of UT's location, a gateway (GW) may map paging messages to a specific beam. Thus, a paging message needs only be sent to the beam where UT resides. The UT location can also be useful for a handover process.

The present teachings use a UT's measurement downlink reference signal power from the adjacent cells, {Pa1, Pa2, . . . , Pak}, where k is the total number of adjacent cells. In a typical hexagon cellular network structure k is 6. In some embodiments, a measurement of the downlink signal power (Pc) for the cell that the UT is camping on may be used. The UT may report the measurements back to the gateway (GW). The GW may then estimate the UT location based on a difference between the reference signal power of the camped cell and adjacent cells reference either in linear ratio or in a decibel (dB) scale (DPi) which are conceptually equivalent. In other words, in linear ratio DPi=Pc/Pai or in decibel DPi=10*log 10(Pc/Pai), where i=1, 2, . . . , J, where J is the total number of adjacent beams.

The estimate may be based on the downlink signal power differences DPi measured at the UT. The downlink signal power differences DPi may be communicated to the neural network classifier may be disposed in the GW or the UT. The GW may receive the downlink signal power differences DPi from the UT via a communications link, for example, a satellite link.

As a relative power, DPi is not affected by fading caused signal power fluctuation. As such the relative power DPi may be used during training or post training operation.

The Neural Network weights are trained based on the known beam pattern of the cell which UT is camped on and its adjacent cells. The weights can be updated during operation with the help of geolocation information for a pilot UT disposed in the coverage area of the beam serving the UT. Pilot UTs collect and disseminate training data in training or operation.

FIG. 1 illustrates a multi-beam satellite or high-altitude platform system according to various embodiments.

A beam communication system 100 may include a gateway 116 connecting to a platform 110 to provide a radio signal over a coverage area. The coverage area may be tessellated into a camping cell 105 and adjacent cells 102-1, 102-2, 102-3, 102-4, 102-5, 102-6. The tessellation may result in irregular shapes in the coverage area due to coverage area contour, angle of beam, shaping of the beam by a beamformer or the like. The shape of the camping cell 105 is not primary information needed for the present teachings; the beam center geolocation and relative offsets of each of the grid points from the beam center (FIG. 1 center C) are the primary information needed for the present teachings.

The gateway 116 may transmit uplinks 120 to the platform 110. The platform 110 may relay the uplinks 120 to corresponding cells as beams or downlinks. In FIG. 1, a camping beam 112 (selected from the uplinks 120) may illuminate the camping cell 105. Camping cell 105 may be managed as a hexagon 104 having a radius 106 within the system 100. The camping beam 112 may target a center C. The center C of camping cell 105 and a beam center of the camping beam 112 may or may not be coincident. In some embodiments, relative offsets of the grid points are measured from the beam center of the camping beam 112. An adjacent beam 114 may illuminate the adjacent cell 102-3. Even though all the adjacent cells 102-1, 102-2, 102-3, 102-4, 102-5, 102-6 are illuminated by corresponding beams, only one of the adjacent beams (adjacent beam 114) is illustrated in FIG. 1 for clarity.

The system 100 may include a User Terminal (UT) 108 disposed within the camping cell 105. The UT 108 may receive the camping beam 112 and the adjacent beams 114. The UT 108 may estimate and/or measure a signal strength of the camping beam 112 and the adjacent beams 114. The signal strength may be estimated/measured in decibels. The UT 108 may receive the camping beam 112 and the adjacent beams 114. The UT 108 may communicate the signal strengths to a geolocation estimator 118.

The system 100 may include a geolocation estimator 118. In some embodiments, the geolocation estimator 118 may be disposed with the gateway 116. In some embodiments, the geolocation estimator 118 may be disposed with the UT 108. In some embodiments, the beams (the camping beam 112 and the adjacent beams 114) may be transmitted using one or more different transmit powers. The signal strength may be normalized by baselining the transmit power of a beam to a standard/common strength. The normalizing maybe performed by the geolocation estimator 118. The geolocation estimator 118 may calculate geolocations relative to the camping beam center C of the camping beam 112. The geolocation of the camping beam center C may be known by the gateway 116. In some embodiments, the geolocation estimator may include a neural network classifier. In some embodiments, the geolocation estimator may include a geolocation interpolator including a look up table.

The platform 110 may include a High-Altitude Platform (HAP), Geosynchronous Earth Orbit (GEO) satellite, a Medium Earth Orbit (MEO), a Low Earth Orbit (LEO) satellite, an airplane, a platform about 20,000 feet above sea-level or the like. For multi-beam non-geosynchronous satellite networks, signal strength measurements from the same satellite at a given time may be used. For non-GEO satellite systems, the offset calculation to determine the UT geolocation may be based on a non-geosynchronous satellite's ephemeris and a geolocation of the beam center over time. These values be used to calculate the geolocation of the UT.

A beam's signal power ratio profile of a specific location in a cell is unique for each grid point. The beam may be a forward link from the gateway 116 to the platform 110 to the camping cell 102-C. At a unique location inside a cell, the ratio of forward link signal power (Pc) of the center cell over that of the adjacent cells (Pai, which is from the ith adjacent cell) provides a power ratio profile Pc/Pai. In some embodiments, only a first ring of the adjacent cells is evaluated to estimate a geolocation.

The frequency reuse factor of the beam communication system is not a factor as the signal power of the adjacent cells provides the information necessary to estimate the geolocation.

Figure 2:
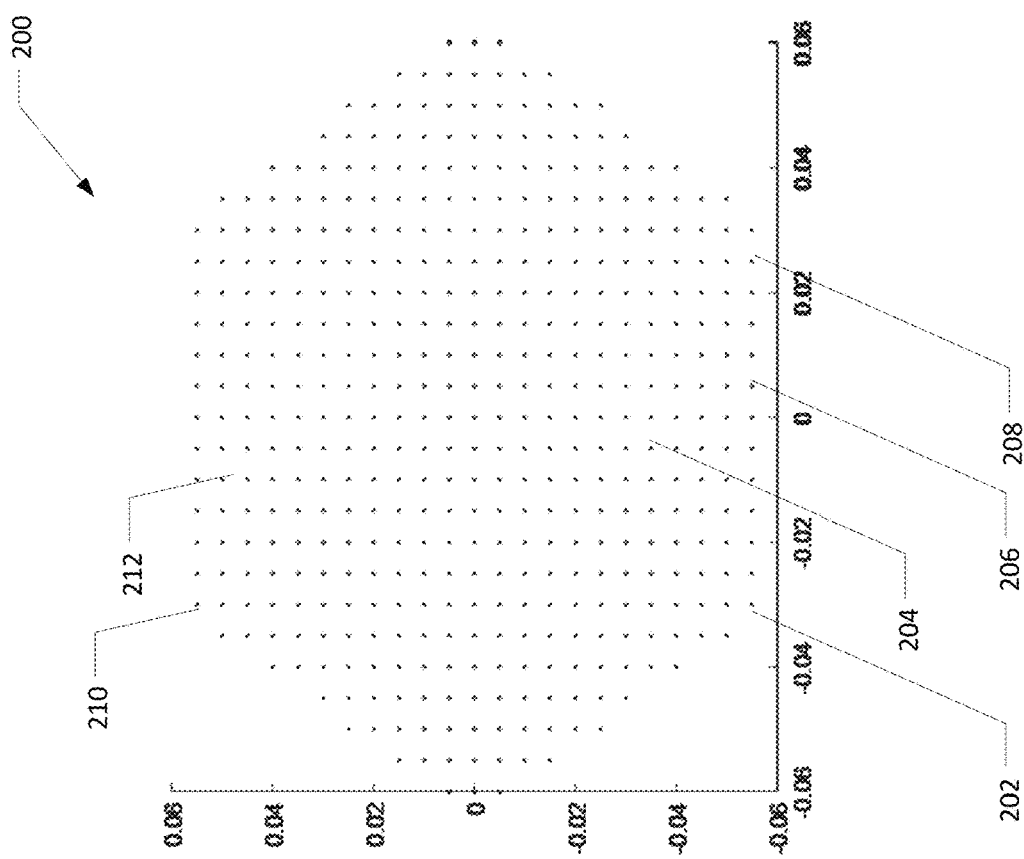
FIG. 2 illustrates a camping cell subdivided into grid points according to various embodiments.

FIG. 2 illustrates a camping cell subdivided into grid points according to various embodiments.

FIG. 2 illustrates a camping cell 200 subdivided into grid points, for example, 443 grid points. At every grid point in the camping cell, ratios (see FIG. 3) of a radiation pattern from the camping beam and adjacent beams (for example, the six adjacent beams of FIG. 1) can be used to train Neural Network (NN) weights assuming the transmission power of the cells is equal or can be stored as LUT for pattern matching. Different grid point will have a different profile pattern, for example, a DPi profile pattern, and a different pattern may be mapped to a different grid point. In some embodiments, the grid points may be normalized to a triple radius cross point, for example, triple radius cross point 122. A grid point geolocation may be associated with each grid point. The grid point geolocation may be relative to the camping cell center.

Figure 3:
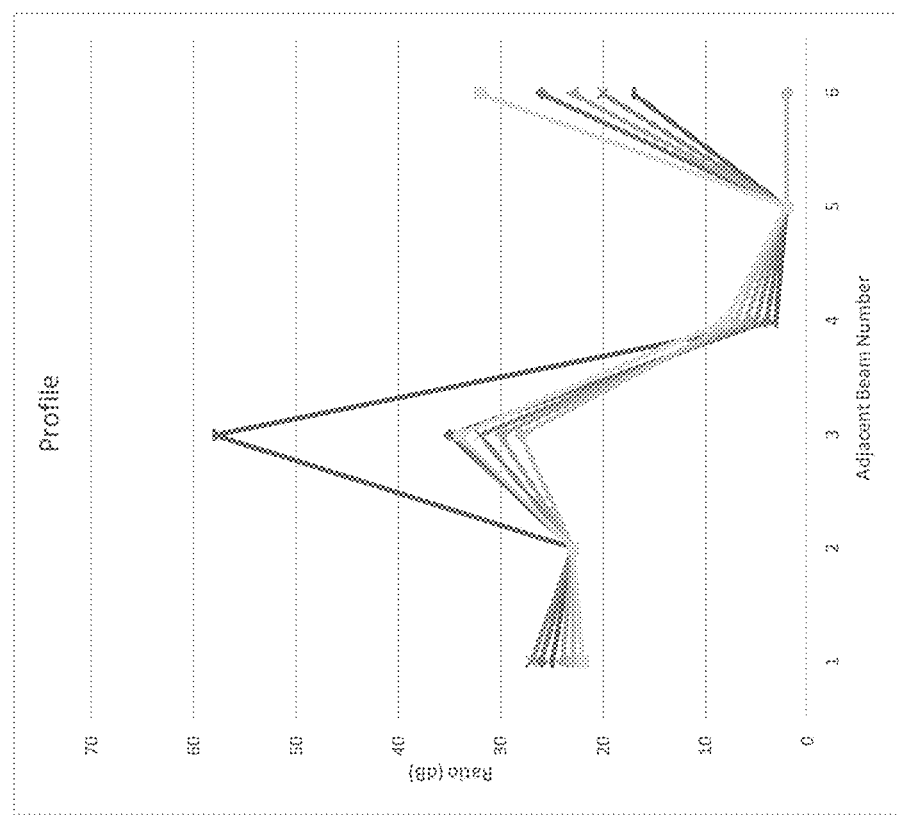
FIG. 3 illustrates power ratios of exemplary grid points according to various embodiments.

FIG. 3 illustrates power ratios of exemplary grid points according to various embodiments.

In the multi beam system, each cell has a reference signal, and all the reference signals are orthogonal to each other, and a signal power of the reference signal can be measured. Each cell's reference signal (generally a sidelobe of a reference signal) may be measured within adjacent cells. So, for example, the UT 108 can measure a signal strength of the reference signal of each of the adjacent cells. The reference signal of each of the adjacent cells does not need to be of sufficient power to obtain a signal lock; it just needs to be measured. When the transmission power of the cells is unequal, the transmission power can be adjusted according to a reference transmit power. The reference transmit power may be used in training a neural network or other reference mappings. Ratios of camping cell beam power to an adjacent cell beam for grid points 202, 204, 206, 208, 210 and 212 are plotted in FIG. 3.

A Closer Look of Power Ratio Profile vs Grid Points

In some embodiments, the coordinates of grid points are normalized to a camping cells triple crossover radius (for example, radius 106 of FIG. 1). An adjacent cell's frequency reuse factor doesn't affect the adjacent cell signal (for example, forward link) power measurement. The UT need only tune its RF front end to an adjacent cell's frequency band.

A unique PN sequence (Pseudo-random Noise sequence) may be assigned to a cell as a cell reference signal for forward link transmission from GW to UT. The PN sequences may be orthogonal to each other for co-channel cells. Exemplary widely used PN sequences are Gold Code Sequences. Each cell may broadcast it's the PN sequence periodically or continuously based on system need.

In some embodiments, signal transmission power and power density are identical for different beams (for example forward links) even though they use different frequency band and different polarization. The signal power at the receiver may rely on the radiation pattern of the beams. In some embodiments, the transmission power may vary between different beams, and the variation in the power can be compensated after calibration and possibly normalization.

Neural Network Training

In some embodiments, known beam patterns and signal strengths at various grid points in a camping cell may be used for Neural Network Training. In some embodiments, signal strengths for a subset of grid points may be used for the Neural network training. In some embodiments, signal strengths of some of the grid points may be calculated or estimated. In some embodiments, signal strengths of some of the grid points may be measured, for example, by a pilot UT.

Training data input for a neural network may be simulated using a beam pattern in a far field using algorithms known in the art. In some embodiments, training data may provide for the triple crossover power level may be 5 dB lower than beam peak for beam patterns of each cell. Moreover, in the training data, all the coordinates of grid points of a cell may be normalized to its triple crossover radius.

In some embodiments, a difference (expressed as DPi) between the camping cell reference signal power and adjacent cell reference signal power may be expressed as $DP_i=10*\log 10(P_c/P_{ai})$, where an adjacent cell's forward link reference signal power is $P_{ai}$ (i=1, 2, ..., 6) and the camping cell's forward link signal power is $P_c$. The DPi at different grid points may be used as training data input. When fading happens at UT, both Pc and Pai may experience path loss or degradation, and DPi may remain the same. As such, the DPi may be chosen to train the neural network rather than the Pc and Pai.

A Neural Network Model for grid point coordination estimation may assume:
6 input nodes for DPi;
2 output nodes for soft normalized grid point coordinates;
2 hidden layers;
20 nodes for each layer;
Weights trained on DPi inside a cell with 6 adjacent cells; and
half of the total grid points are used for training.

The estimated location error is proportional to the cell size. If the cell is bigger, the absolute estimation error is bigger. If a cell size of 100 km in radius, the location estimation error is dependent on C/I measurement error. In simulations, a location estimation tested with Gaussian distributed measurement error was evaluated on all the grid points. The estimated geolocations provided by a 20-node neural network resulted in geolocations were:
less than 1.2 km with 90% confidence for perfect signal measurement,
less than 1.75 km with 90% confidence for 1 sigma 0.2 dB measurement error,
less than 4 km with 90% confidence for 1 sigma 0.5 dB measurement error, and
less than 7.5 km with 90% confidence for 1 sigma 1 dB measurement error.

Better results were achieved with a 35-node neural network that estimated geolocations with 0.65 km with 90% confidence. In some embodiments, number of nodes may be increased to 35-nodes when an accuracy less than 1 km is desirable.

Measurement Error Contributor and Potential Improvement

Some factors may contribute to the UT receiver signal power measurement error for the power ratio profile. For example, a slow varying satellite pointing error may cause a location estimation offset that can be compensated by a pilot UT's common shift in location estimation or even prediction. Pilot UTs are terminals are provided an accurate location of self, which may be either manually input by user/installer or GNSS based.

A fast-moving satellite, for example, a MEO or LEO satellite, pointing error will affect location estimation accuracy. Location estimation accuracy may be improved by accounting for the satellite location and a camping beam center geolocation more frequently. The accuracy may be improved by computing the results in shorter time interval and/or using the history of previous locations data. Independent measurements by pilot UTs could be used to reduce the errors quite a bit as the pilot UT probably did not move between the measurements.

Errors may also be introduced by a mismatch in a training radiation pattern and an in-field radiation pattern. A good calibration procedure may reduce the mismatch.

The training can be done based on the beam pattern provided by the manufacturer initially and can be updated by actual measurement. Retraining of the neural network may be attempted in-field by pilot UTs. The pilot UTs can solve the mismatch problem if UTs with known accurate locations or GPS receivers provide location reference and long-term measurement of the UT's power ratio profile.

Thermal noise's effect will be trivial with long enough averaging period when Pc/Noise and Pai/Noise is high enough (e.g. 20 dB or above)

UT Location Estimation Method

Figure 4:
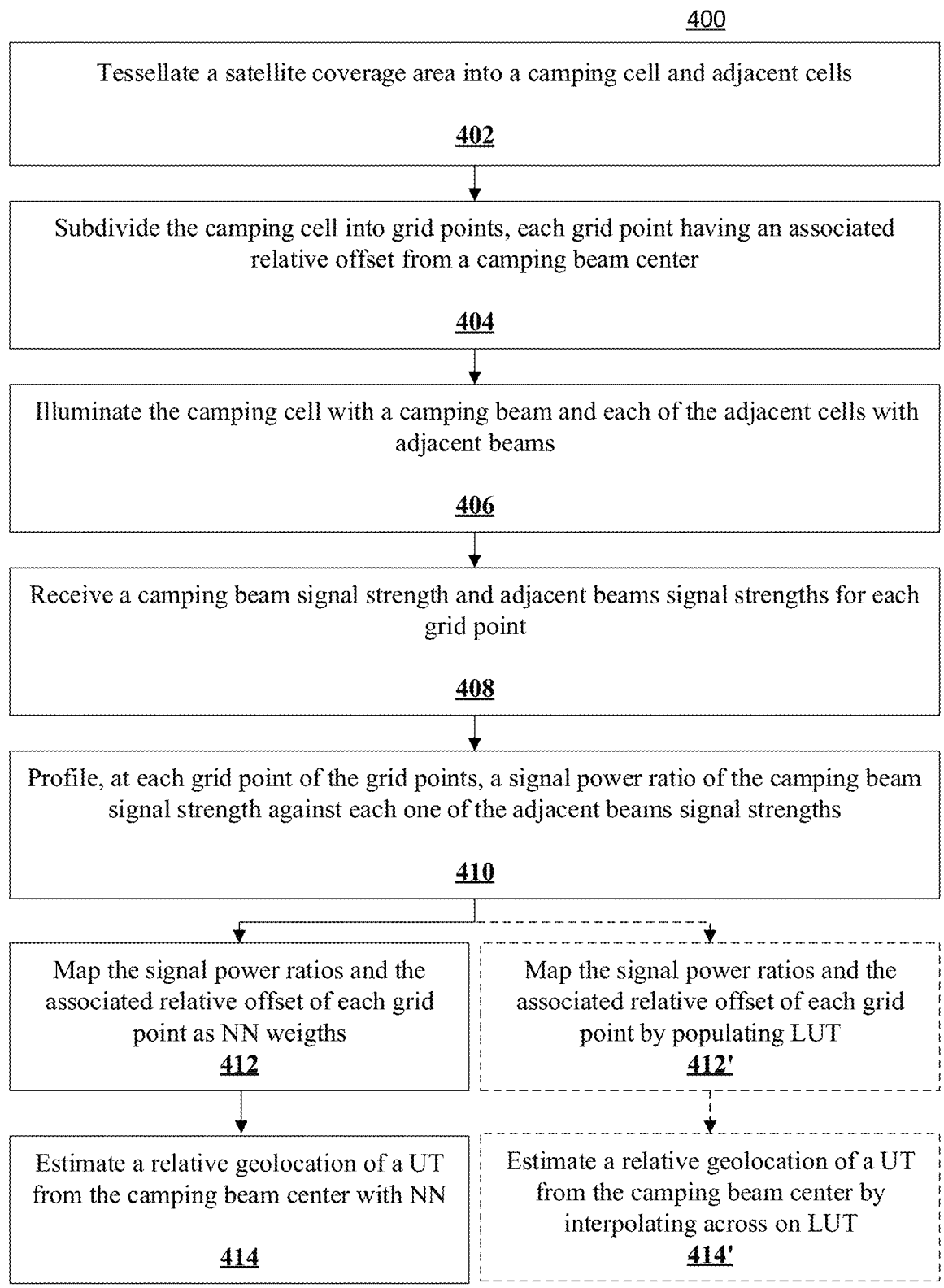
FIG. 4 illustrates a method for estimating a geolocation according to various embodiments.

FIG. 4 illustrates a method for estimating a geolocation according to various embodiments.

A method 400 for estimating a geolocation of a user terminal (UT) may include an operation 402 to tessellate a satellite coverage area into a camping cell and adjacent cells. The method 400 may include operation 404 to subdivide the camping cell into grid points, each grid point having an associated relative offset from a camping beam center. The method 400 may include operation 406 to illuminate the camping cell with a camping beam aimed at the camping beam center and each of the adjacent cells with adjacent beams. The method 400 may include operation 408 to receive a camping beam signal strength and adjacent beams signal strengths for each grid point. The method 400 may include operation 410 for profiling, at each grid point, a signal power ratio of the camping beam signal strength against each one of the adjacent beams signal strengths.

In some embodiments, the method 400 may include operation 412 and operation 414. Operation 412 may map the signal power ratios and the associated relative offset of each grid point as NN weights. The operation 414 may estimate, with the neural network, a relative geolocation of a UT from the center based on a UT camping beam signal strength and UT adjacent beams signal strengths. In other embodiments, the method 400 may include operation 412' and operation 414'. Operation 412' may map the signal power ratios and the associated relative offset of each grid point as NN by populating a Look-Up Table (LUT). The operation 414' may estimate a relative geolocation of a UT from the center based on a UT camping beam signal strength and UT adjacent beams signal strengths by interpolating for the relative geolocation across the LUT.

In exemplary embodiments, the method 400 for UT location estimation is assisted by a gateway. The UT may measure signal power of the camping cell and adjacent (usually 7 cells; camping cell on a coverage area border may have less than adjacent cells) and reports the measurements to the gateway. Neural networks weights used at the gateway may be pretrained with the beam patterns before network operation. In other embodiments, neural network weights may be built during network operation as, for example, pilot UTs report their location and signal measurements. The data from the pilot UTs may be used to train the neural network weights and continuously optimize/train the weights. A UT without location information only report power measurement, GW can calculate its location based on the trained NN weights.

The gateway may have a set of neural network weights associated with each cell served by the gateway. As such, a gateway serving N-cells of a coverage area may have N-sets of neural network weights. Each of the N-cells may have different shapes and sizes.

UT Location Estimation by Interpolation

Figure 5:
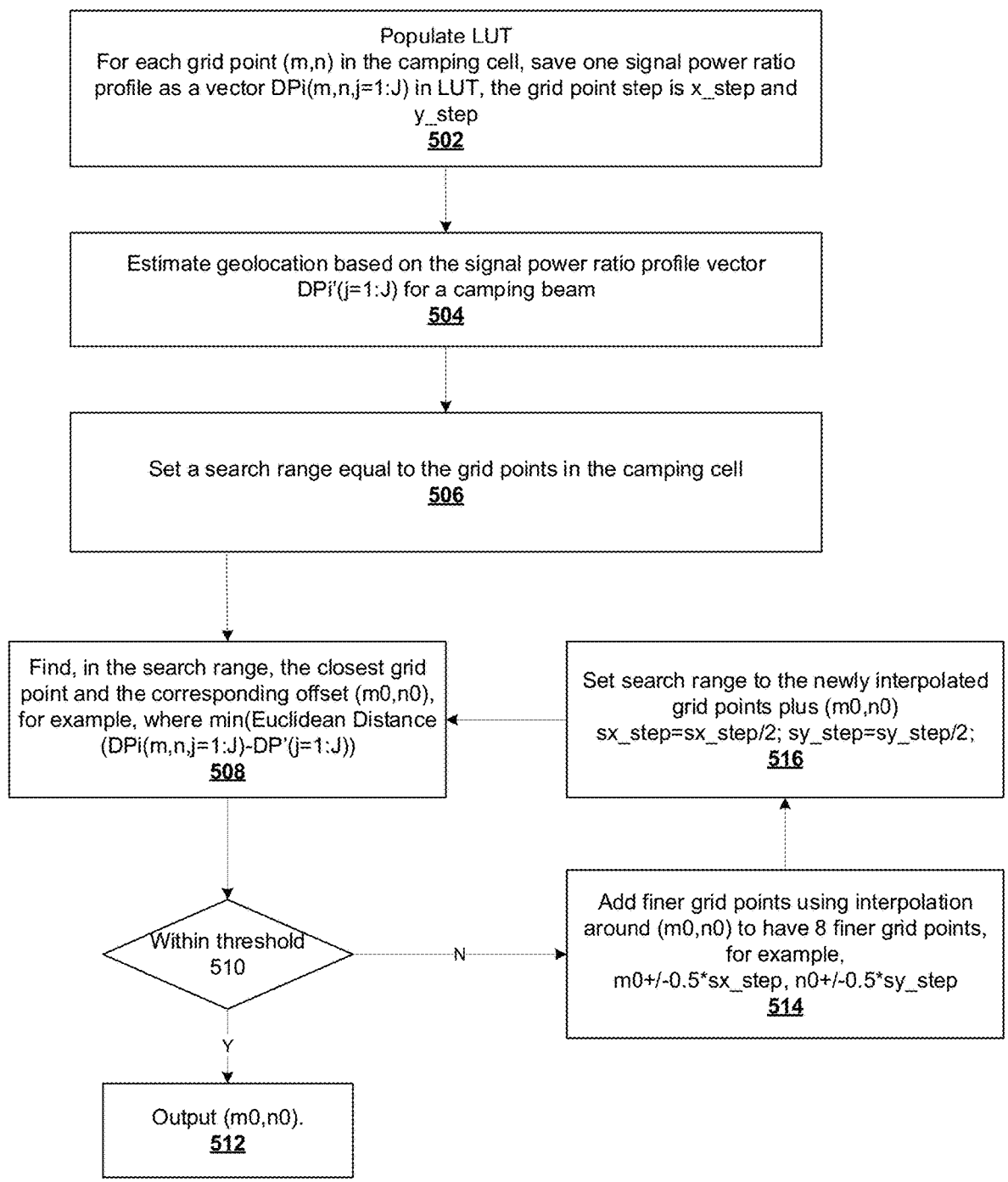
FIG. 5 illustrates a method for interpolating a geolocation according to various embodiments.

FIG. 5 illustrates a method for interpolating a geolocation according to various embodiments.

A method 500 for interpolating a geolocation may include an operation 502 to populate a Look Up Table (LUT) with DPi as vectors. The LUT may include a DPi value for every cell in a coverage area. In some embodiments, operation 502 may, for each grid point (m,n) in the camping cell, save one signal power ratio profile as a vector DPi(m,n,i=1:J) in the look up table (LUT) for the grid points, using for example, a grid point step of x_step and y_step to step between different cells included in the coverage area.

The method 500 may include operation 504 to estimate a geolocation based on a signal power ratio profile vector, for example, vector DPi'(i=1:J), for a camping beam. The method 500 may include an operation 506 to set a search range equal to the grid points in the camping cell. The method 500 may include an operation 507 to find, in the search range, the closest grid point and the corresponding offset (m0,n0), for example, by searching for min(Euclidean Distance (DP(m,n,i=1:J)−DP'(i=1:J)).

The method 500 may include operation 510 to determine if the vector at corresponding offset (m0,n0) is within a threshold, min(Euclidean Distance (DP(m,n,i=1:J)−DP'(i=1:J))<ε. Operation 510 may also include (not shown) a loop counter that stops the searching after a threshold number of iterations. When the determination at operation 510 indicates within threshold, method 500 may output the grid point (m0,n0) at operation 512. When the determination at operation 510 indicates not within threshold, method 500 may include operation 514 to add finer grid points using interpolation around (m0,n0) to add finer grid points, for example, eight finer grid points using m0+/−0.5*sx_step, n0+/−0.5*sy_step. After adding the finer grid points at operation 514, the method 500 may perform operation 516 to set search range to the newly interpolated grid points plus (m0, n0) and reperform operations 508, 510, 514 and 516 until operation 510 indicates otherwise.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

We claim as our invention:

1. A method for estimating a geolocation, the method comprising:
    illuminating, with a platform, a camping cell and adjacent cells of the camping cell with a camping beam and each of the adjacent cells with adjacent beams;
    receiving a camping beam signal strength, a camping beam center, adjacent beams signal strengths, and an associated relative offset from the camping beam center for points in the camping cell;
    profiling, at each point of the points, ratios of the camping beam signal strength to each one of the adjacent beams signal strengths;
    mapping the ratios and the associated relative offset of each point of the points; and
    estimating a relative geolocation of a user terminal (UT) from the camping beam center based on a UT camping beam signal strength and UT adjacent beams signal strengths,
    wherein the mapping comprises pretraining neural network weights of a neural network with ratios and the associated relative offsets, and the estimating estimates the relative geolocation of the UT with the neural network.

2. The method of claim 1, further comprising receiving a UT geolocation, a UT camping beam signal strength and UT adjacent beams signal strengths; and training the neural network with the UT geolocation, the UT camping beam signal strength and UT adjacent beams signal strengths.

3. The method of claim 1, wherein the receiving comprises measuring, at one or more of the points, the camping beams signal strength and the adjacent beams signal strengths.

4. The method of claim 1, wherein the receiving comprises computing, at one or more of the points, the camping beams signal strength and the adjacent beams signal strengths.

5. The method of claim 1, further comprising adjusting the camping beam signal strength and each one of the adjacent beams signal strengths to a reference transmit power.

6. The method of claim 1, wherein the ratios are calculated as Pc/Pai or 10*log 10(Pc/Pai), with the Pc set to the camping beam signal strength and the Pai set to each one of the adjacent beams signal strengths in turn.

7. The method of claim 1, further comprising:
    predicting a location estimate offset based on a slow varying Geosynchronous-Earth Orbit satellite pointing error or a movement of the camping beam center based on the relative geolocation, an actual geolocation of the UT and ephemeris of the platform; and
    compensating for the location estimate offset in the estimating.

8. The method of claim 1, wherein the neural network is updated during operation with a geolocation information for a pilot UT disposed in the camping cell.

9. A method for estimating a geolocation, the method comprising:
- illuminating, with a platform, a camping cell and adjacent cells of the camping cell with a camping beam and each of the adjacent cells with adjacent beams;
- receiving a camping beam signal strength, a camping beam center, adjacent beams signal strengths, and an associated relative offset from the camping beam center for points in the camping cell;
- profiling, at each point of the points, ratios of the camping beam signal strength to each one of the adjacent beams signal strengths;
- mapping the ratios and the associated relative offset of each point of the points; and
- estimating a relative geolocation of a user terminal (UT) from the camping beam center based on a UT camping beam signal strength and UT adjacent beams signal strengths,
- wherein the mapping comprises populating a look up table (LUT) with ratios and the associated relative offset, and the estimating by interpolation from measured ratios of the UT camping beam signal strength and the UT adjacent beams signal strengths between the ratios of points in the LUT to find a best match, and determining the relative geolocation of the UT based on the best match.

10. The method of claim 9, further comprising receiving a UT geolocation, a UT camping beam signal strength and UT adjacent beams signal strengths, wherein the populating comprises adding the UT geolocation, the UT camping beam signal strength and UT adjacent beams signal strengths to the LUT.

11. The method of claim 9, wherein the receiving comprises measuring, at one or more of the points, the camping beams signal strength and the adjacent beams signal strengths.

12. The method of claim 9, wherein the receiving comprises computing, at one or more of the points, the camping beams signal strength and the adjacent beams signal strengths.

13. The method of claim 9, further comprising adjusting the camping beam signal strength and each one of the adjacent beams signal strengths to a reference transmit power.

14. The method of claim 9, wherein the ratios are calculated as Pc/Pai or 10*log 10(Pc/Pai), with the Pc set to the camping beam signal strength and the Pai set to each one of the adjacent beams signal strengths in turn.

15. The method of claim 9, further comprising:
- predicting a location estimate offset based on a slow varying Geosynchronous-Earth Orbit satellite pointing error or a movement of the camping beam center based on the relative geolocation, an actual geolocation of the UT and ephemeris of the platform; and
- compensating for the location estimate offset in the estimating.

16. A method for estimating a geolocation, the method comprising:
- illuminating, with a platform, a camping cell and adjacent cells of the camping cell with a camping beam and each of the adjacent cells with adjacent beams;
- receiving a camping beam signal strength, a camping beam center, adjacent beams signal strengths, and an associated relative offset from the camping beam center for points in the camping cell;
- profiling, at each point of the points, ratios of the camping beam signal strength to each one of the adjacent beams signal strengths;
- mapping the ratios and the associated relative offset of each point of the points;
- estimating a relative geolocation of a user terminal (UT) from the camping beam center based on a UT camping beam signal strength and UT adjacent beams signal strengths;
- predicting a location estimate offset based on a slow varying Geosynchronous-Earth Orbit satellite pointing error or a movement of the camping beam center based on the relative geolocation, an actual geolocation of the UT and ephemeris of the platform; and
- compensating for the location estimate offset in the estimating.

17. The method of claim 16, wherein the platform is selected from a High-Altitude Platform (HAP), Geosynchronous Earth Orbit (GEO) satellite, a Medium Earth Orbit (MEO), a Low Earth Orbit (LEO) satellite, an airplane, or a platform 20,000 feet or above sea-level.

18. The method of claim 16, wherein the points are normalized to a triple radius cross point.

19. The method of claim 16, wherein the camping beam signal strength, and the adjacent beams signal strengths are simulated using a beam pattern in a far field.

20. The method of claim 16, wherein a frequency of the compensating is based on a movement speed of the platform relative to the camping beam center.

* * * * *